(12) United States Patent
Hu

(10) Patent No.: US 11,318,065 B2
(45) Date of Patent: May 3, 2022

(54) ADAPTOR CONNECTING MECHANISM OF DILDO

(71) Applicant: YouJun Hu, Shenzhen (CN)

(72) Inventor: YouJun Hu, Shenzhen (CN)

(*) Notice: Subject to any disclaimer, the term of this patent is extended or adjusted under 35 U.S.C. 154(b) by 149 days.

(21) Appl. No.: 16/994,613

(22) Filed: Aug. 16, 2020

(65) Prior Publication Data

US 2022/0047450 A1 Feb. 17, 2022

(51) Int. Cl.
*A61H 19/00* (2006.01)
*F16B 7/04* (2006.01)

(52) U.S. Cl.
CPC ............. *A61H 19/44* (2013.01); *F16B 7/042* (2013.01); *A61H 2201/0107* (2013.01)

(58) Field of Classification Search
CPC ........ A61H 19/00; A61H 19/40; A61H 19/44; A61H 21/00; A61H 23/00
See application file for complete search history.

(56) References Cited

U.S. PATENT DOCUMENTS

| 7,699,795 B2 * | 4/2010 | Nan ..................... A45D 34/041 601/72 |
| 2009/0234182 A1 * | 9/2009 | Buchholz ............... A61H 19/00 705/40 |
| 2013/0178769 A1 * | 7/2013 | Schmidt ............. A61H 23/0263 601/46 |
| 2017/0087049 A1 * | 3/2017 | Hutchison .............. A61H 19/40 |
| 2017/0224579 A1 * | 8/2017 | Green ................. G06Q 30/0621 |

* cited by examiner

*Primary Examiner* — John P Lacyk
(74) *Attorney, Agent, or Firm* — Rumit Ranjit Kanakia

(57) ABSTRACT

The invention discloses a connecting mechanism of a dildo. One end of a driving mechanism connecting end is connected to one end of a connecting mechanism body, and the other end of driving mechanism connecting end is provided with a driving mechanism connecting member. One end of a dildo connecting end is provided with a dildo connecting member, and the other end of the dildo connecting end is connected to the other end of the connecting mechanism body. The other end of the dildo connecting end is provided with a connecting column, the inside of the other end of the connecting mechanism body is provided with an internal connecting cavity matched with the connecting column, and the connecting column is inserted into the internal connecting cavity. A concave limiting groove is formed in the connecting column circumferentially, a limiting member embedding groove communicated with the internal connecting cavity is formed in an outer wall of the connecting mechanism body, and a limiting member is embedded in the limiting member embedding groove. An outer sleeve is sleeved over the outside of the connecting mechanism body, a protrusion I is arranged at an inner wall of the outer sleeve, and when the protrusion I corresponds to the limiting member embedding groove in position, the protrusion I exerts a pressure on the limiting member. The invention helps to solve the problem of easy separation of a dildo and a driving mechanism.

15 Claims, 8 Drawing Sheets

ADAPTOR CONNECTING MECHANISM OF DILDO

TECHNICAL FIELD

The invention relates to the technical field of sex toys, and particularly, to an adaptor connecting mechanism of a dildo.

BACKGROUND

Sex toys have an improvement effect on women suffering from frigidity and men with dysfunction, or middle-aged couples who have difficulty in having sex, and can also be configured to relieve sexual repression, and alleviate mental perplexity and depression due to chronic sexual repression. Therefore, in recent years, the sex toy market is expanding. For products currently on the market, connection between a dildo and a driving mechanism generally adopts fixed connection and detachable connection. The fixed connection is generally non-detachable or difficult to disassemble, so this connection mode is inconvenient for replacement of the dildo. The current detachable connection mode has poor firmness, and the dildo is easily separated from the driving mechanism in a vibration or rotation process.

SUMMARY

In view of deficiencies in the prior art, the invention aims to provide an adaptor connecting mechanism of a dildo, which helps to solve the problem of easy separation of a dildo and a driving mechanism.

In order to achieve the above objective, the invention adopts the following technical solution:

A connecting mechanism of a dildo includes a dildo connecting end, a driving mechanism connecting end and a connecting mechanism body. One end of the driving mechanism connecting end is connected to one end of the connecting mechanism body, and the other end of driving mechanism connecting end is provided with a driving mechanism connecting member. One end of the dildo connecting end is provided with a dildo connecting member, and the other end of the dildo connecting end is connected to the other end of the connecting mechanism body. The other end of the dildo connecting end is provided with a connecting column, the inside of the other end of the connecting mechanism body is provided with an internal connecting cavity matched with the connecting column, and the connecting column is capable of being inserted into the internal connecting cavity. A concave limiting groove is formed in the connecting column circumferentially, a limiting member embedding groove communicated with the internal connecting cavity is formed in an outer wall of the connecting mechanism body circumferentially, a limiting member is embedded in the limiting member embedding groove, and the limiting member is capable of entering the limiting groove. An outer sleeve is sleeved over the outside of the connecting mechanism body, and the outer wall of the connecting mechanism body has a space for the outer sleeve to move axially. A protrusion I is arranged at an inner wall of the outer sleeve, and when the protrusion I corresponds to the limiting member embedding groove in position, the protrusion I exerts a pressure on the limiting member.

Further, a pressing column and a compression spring I are sequentially arranged in the internal connecting cavity in a direction close to the driving mechanism connecting end, when the limiting member is located in the limiting groove, the connecting column exerts a pressure on the pressing column, and the pressing column exerts a pressure on the compression spring I, so that the compression spring I is in a deformed state.

Further, a compression spring II is sleeved over the outside of the connecting mechanism body, and the compression spring II is located between the connecting mechanism body and the outer sleeve. A protrusion II is arranged at an outer wall of one end of the connecting mechanism body, one end of the compression spring II abuts against the protrusion I, and the other end of the compression spring II abuts against the protrusion II.

Furthermore, the protrusion II is arranged continuously around the outer wall of one end of the connecting mechanism body.

Further, the limiting groove is formed continuously around an outer wall of the connecting column circumferentially.

Further, there are a plurality of limiting member embedding grooves, and the plurality of limiting member embedding grooves are formed equidistantly around the outer wall of the connecting mechanism body circumferentially.

Further, one end of the driving mechanism connecting end is provided with an externally threaded connector I, one end of the connecting mechanism body is provided with an internally threaded coupling I, and the externally threaded connector I and the internally threaded coupling I are in thread fit connection.

Further, one end of the driving mechanism connecting end is provided with an externally threaded connector I, one end of the connecting mechanism body is provided with an internally threaded coupling I, and the externally threaded connector I and the internally threaded coupling I are in thread fit connection. The driving mechanism connecting end has a hollow inside and is provided with a partition plate, and the externally threaded connector I and the driving mechanism connecting member are located on two sides of the partition plate respectively. The externally threaded connector I has a hollow inside, one end of the compression spring I extends into the driving mechanism connecting end from the externally threaded connector I and abuts against the partition plate.

Furthermore, the pressing column has a hollow inside, and an end face of one end of the pressing column is closed. An outer diameter of a bottom end of the connecting column is greater than an inner diameter of the pressing column, and the other end of the compression spring I abuts against the end face of one end of the pressing column.

Further, the protrusion I is arranged continuously around the inner wall of the outer sleeve.

Further, an inner wall of one end of the outer sleeve close to the dildo connecting end and the protrusion I jointly form a groove, an embedding ring is sleeved over the outer wall of the connecting mechanism body at a position corresponding to the groove, and the embedding ring is matched with the shape of the groove, and is embedded in the groove.

Further, the dildo connecting end includes an annular spacer, and the dildo connecting member and the connecting column are located on two sides of the annular spacer respectively. An outer diameter of the annular spacer is greater than or equal to an outer diameter of the embedding ring, and the annular spacer is overlapped with the embedding ring.

Further, the driving mechanism connecting member is an internally threaded coupling II.

Further, the dildo connecting member is an externally threaded connector II.

Further, the limiting member adopts a steel ball. The invention has the following beneficial effects: the invention designs a novel dildo connecting member, so that the dildo can be connected onto the driving mechanism quickly, the operation is convenient, the firmness is relatively high, and the dildo is not easy to detach from the driving mechanism.

DETAILED DESCRIPTION

The invention will be further described below in conjunction with the accompanying drawings. It should be noted that the present embodiment provides a detailed implementation and a specific operation process under the premise of the present technical solution, but the protection scope of the invention is not limited to the present embodiment.

Embodiment 1

Figure 5:
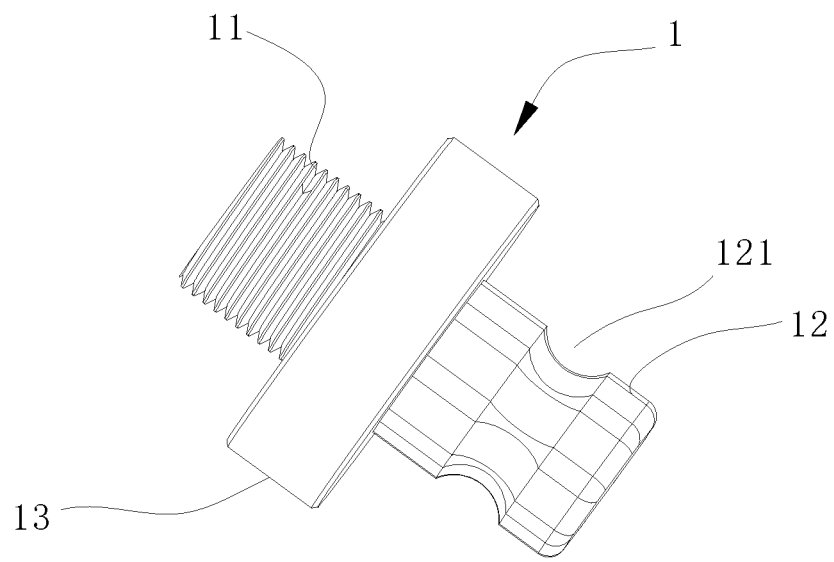
FIG. 5 is a schematic structural diagram of a dildo connecting end in Embodiment 1 of the invention.
Figure 6:
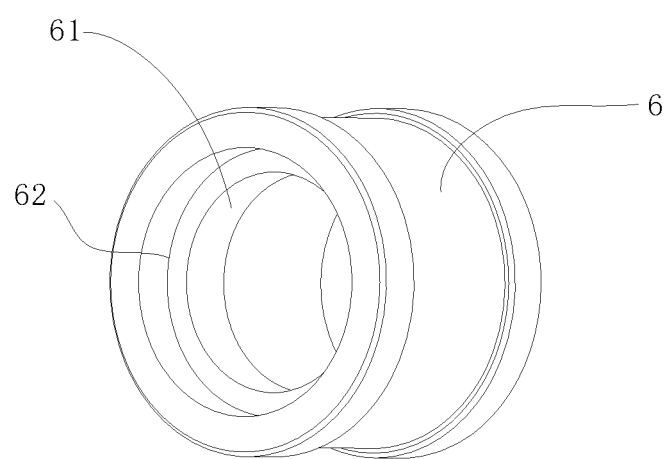
FIG. 6 is a schematic overall structural diagram of an outer sleeve in Embodiment 1 of the invention.
Figure 7:
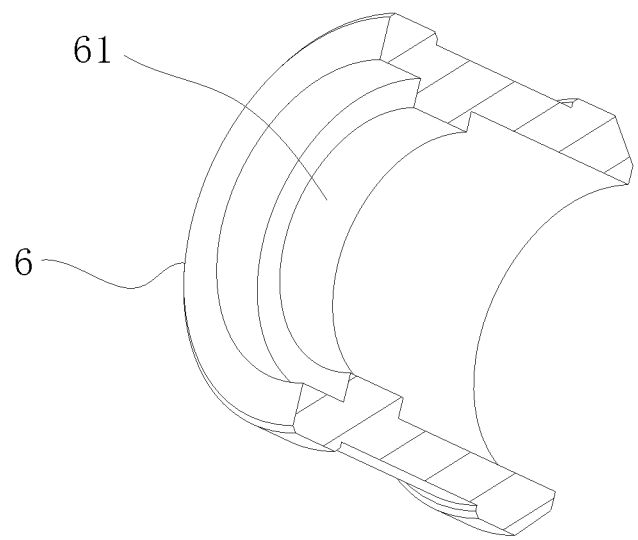
FIG. 7 is an axial cross-sectional view of the outer sleeve in Embodiment 1 of the invention.

As shown in FIG. 1 to FIG. 4, a connecting mechanism of a dildo includes a dildo connecting end 1, a driving mechanism connecting end 2 and a connecting mechanism body 3. One end of the driving mechanism connecting end 2 is connected to one end of the connecting mechanism body 3, and the other end of driving mechanism connecting end is provided with a driving mechanism connecting member 21. One end of the dildo connecting end 1 is provided with a dildo connecting member 11, and the other end of the dildo connecting end is connected to the other end of the connecting mechanism body 3. The other end of the dildo connecting end 1 is provided with a connecting column 12, the inside of the other end of the connecting mechanism body 3 is provided with an internal connecting cavity 31 matched with the connecting column 12, and the connecting column 12 is inserted into the internal connecting cavity 31. A concave limiting groove 121 is formed in the connecting column 12 circumferentially (as shown in FIG. 5), a limiting member embedding groove 32 communicated with the internal connecting cavity 31 is formed in an outer wall of the connecting mechanism body 3 circumferentially at a position corresponding to the limiting groove 121, a limiting member 321 is embedded in the limiting member embedding groove 32, and the limiting member 321 is capable of entering the limiting groove 121. An outer sleeve 6 is sleeved over the outside of the connecting mechanism body 3, and the outer wall of the connecting mechanism body 3 has a space 35 for the outer sleeve 6 to move axially. As shown in FIG. 6 to FIG. 7, a protrusion I 61 is arranged at an inner wall of the outer sleeve 6, and when the protrusion I 61 corresponds to the limiting member embedding groove 32 in position, the protrusion I 61 exerts a pressure on the limiting member 321.

Specifically, an axial length of the connecting mechanism body 3 is greater than an axial length of the outer sleeve 6, so that the outer wall of the connecting mechanism body 3 has the space 35 for the outer sleeve 6 to move axially. Additionally, the space 35 allows the outer sleeve 6 to move so as to realize the protrusion I 61 arranged on the outer sleeve corresponding to the limiting member 321 in position or leaving the position of the limiting member 321, and the limiting member 321 is located within an inner cavity of the outer sleeve 6 all the time (which has the effects of limiting the maximum range of outward movement of the limiting member 321 and prevents the limiting member 321 from falling off from the limiting member embedding groove 32).

Figure 4:
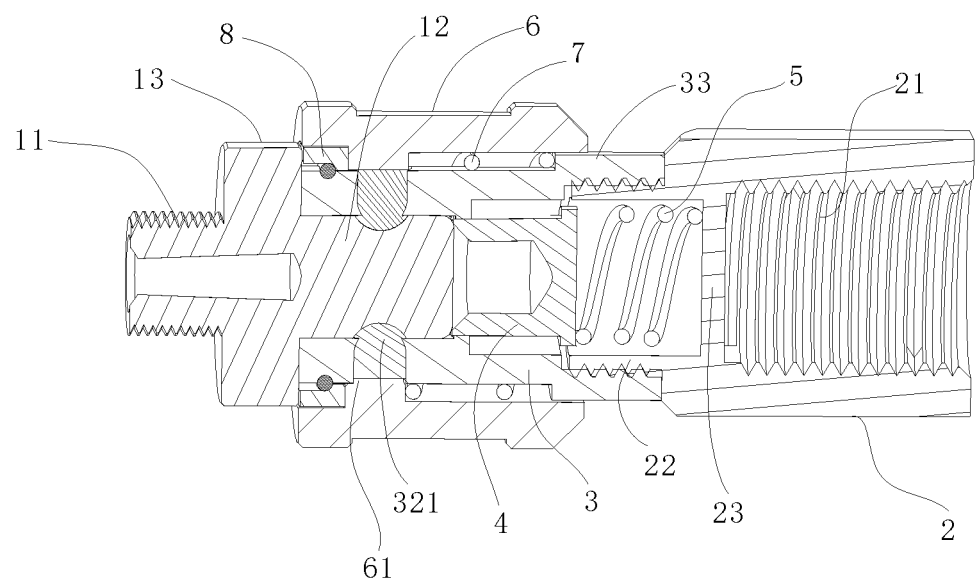
FIG. 4 is an axial cross-sectional view of the connecting mechanism of a dildo in Embodiment 1 of the invention in an assembled state.

In the present embodiment, a pressing column 4 and a compression spring I 5 are sequentially arranged in the internal connecting cavity 31 in a direction close to the driving mechanism connecting end 2, when the limiting member 321 is located in the limiting groove 121, the connecting column 12 exerts a pressure on the pressing column 4, and the pressing column 4 exerts a pressure on the compression spring I 5, so that the compression spring I 5 is in a deformed state (as shown in FIG. 4).

Figure 1:
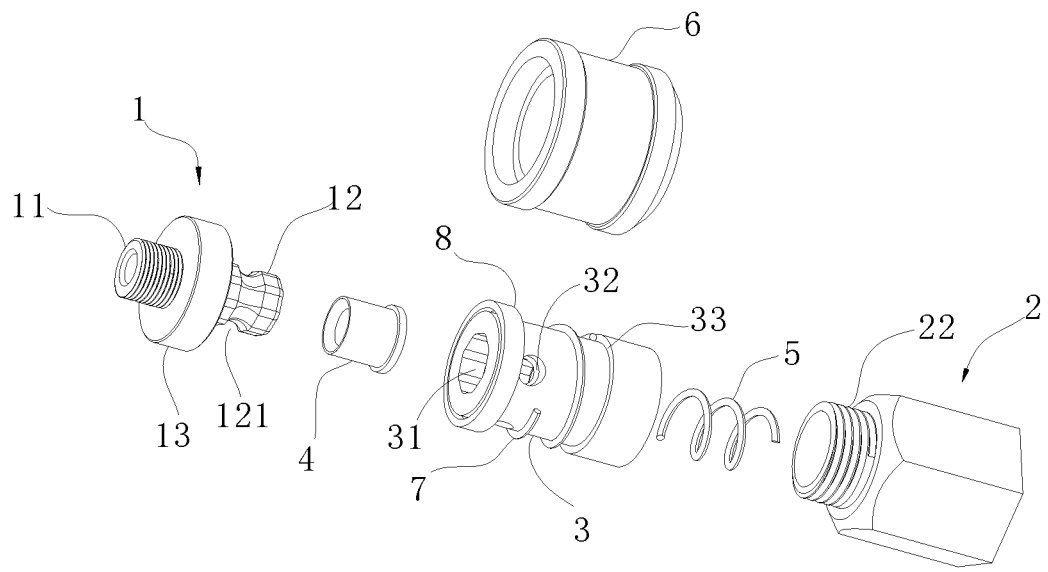
FIG. 1 is a schematic exploded view of a connecting mechanism of a dildo in Embodiment 1 of the invention from one perspective.
Figure 2:
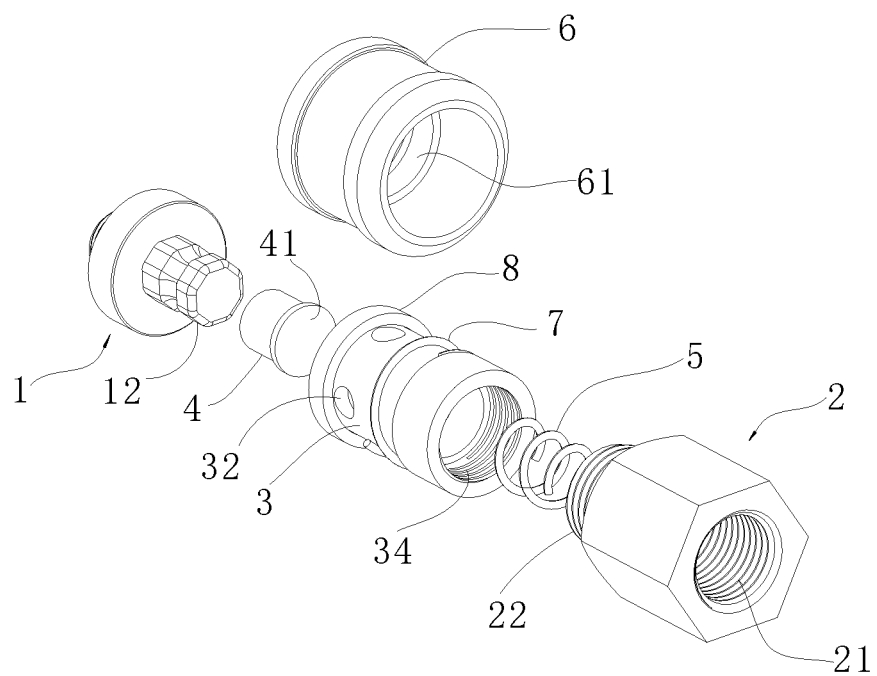
FIG. 2 is a schematic exploded view of the connecting mechanism of a dildo in Embodiment 1 of the invention from another perspective.
Figure 3:
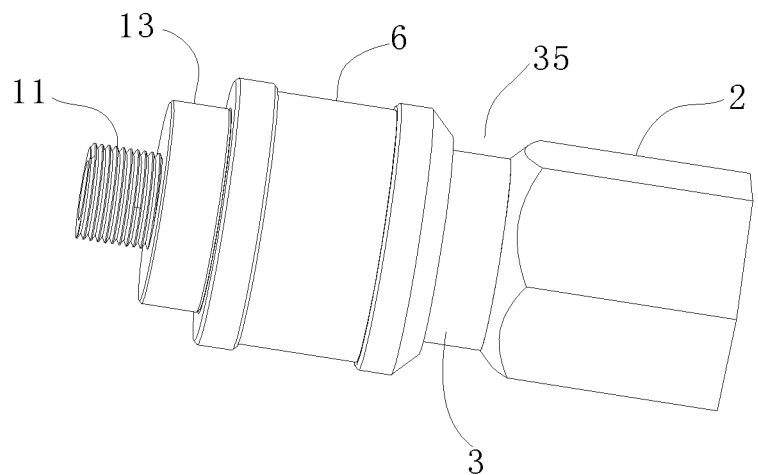
FIG. 3 is a schematic assembly diagram of the connecting mechanism of a dildo in Embodiment 1 of the invention.

In the present embodiment, as shown in FIG. 1 to FIG. 2, a compression spring II 7 is sleeved over the outside of the connecting mechanism body 3, and the compression spring II 7 is located between the connecting mechanism body 3 and the outer sleeve 6. As shown in FIG. 4, a protrusion II 33 is arranged at an outer wall of one end of the connecting mechanism body 3, one end of the compression spring II 7 abuts against the protrusion I 61, and the other end of the compression spring II abuts against the protrusion II 33.

Furthermore, the protrusion II 33 is arranged continuously around the outer wall of one end of the connecting mechanism body 3.

In the present embodiment, the limiting groove 121 is formed continuously around an outer wall of the connecting column 12 circumferentially.

Figure 8:
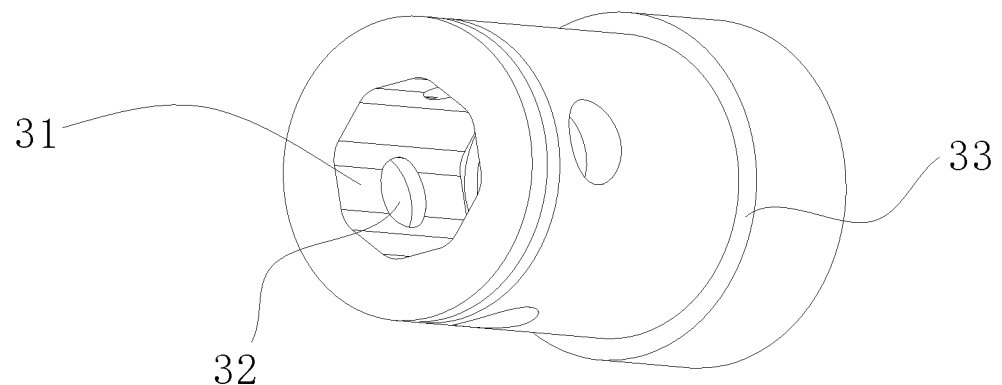
FIG. 8 is a schematic overall structural diagram of a connecting mechanism body in Embodiment 1 of the invention.
Figure 9:
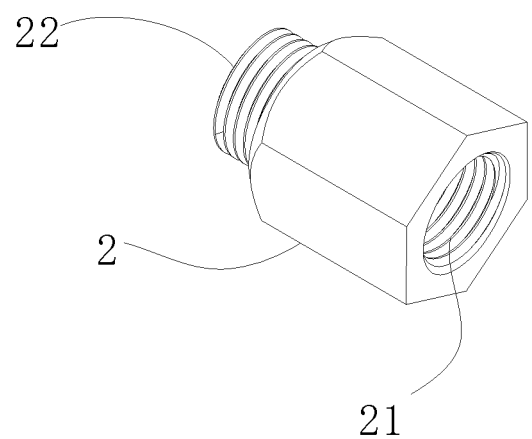
FIG. 9 is a schematic overall structural diagram of a driving mechanism connecting end in Embodiment 1 of the invention from one perspective.
Figure 10:
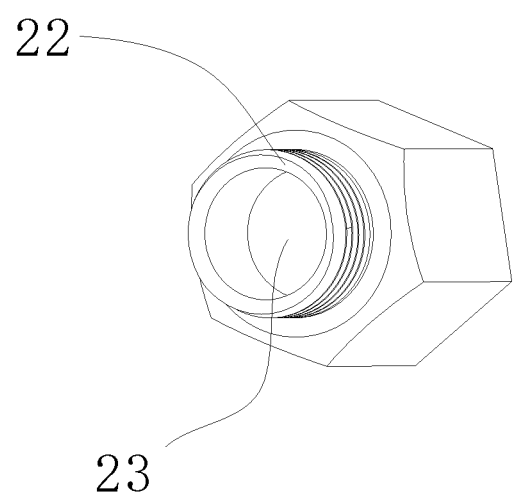
FIG. 10 is a schematic overall structural diagram of the driving mechanism connecting end in Embodiment 1 of the invention from another perspective.
Figure 11:
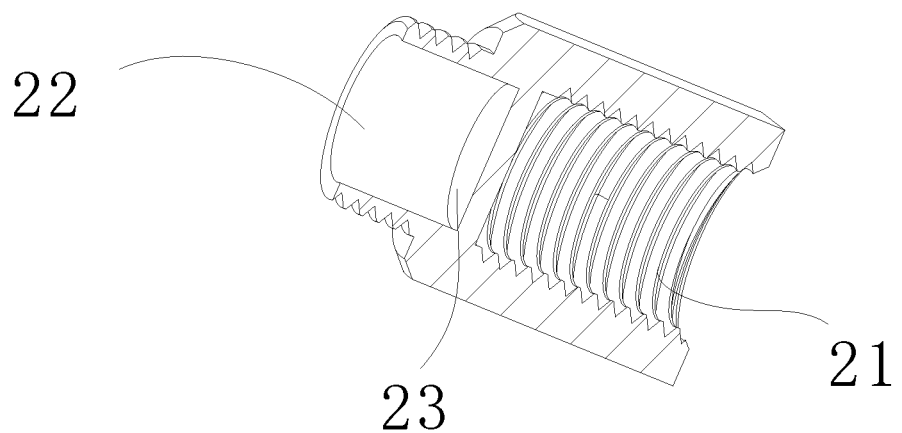
FIG. 11 is an axial cross-sectional view of the driving mechanism connecting end in Embodiment 1 of the invention from one perspective.
Figure 12:
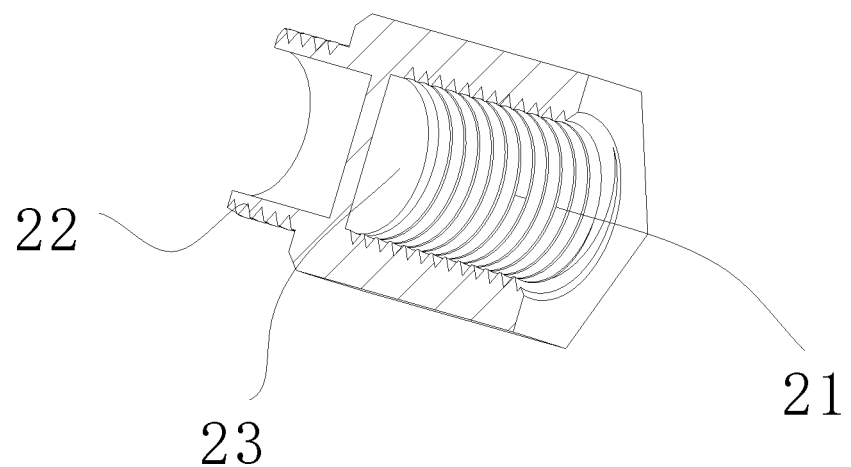
FIG. 12 is an axial cross-sectional view of the driving mechanism connecting end in Embodiment 1 of the invention from another perspective.

In the present embodiment, as shown in FIG. 8, there are a plurality of limiting member embedding grooves 32, and the plurality of limiting member embedding grooves 32 are formed equidistantly around the outer wall of the connecting mechanism body 3 circumferentially.

In the present embodiment, as shown in FIG. 9 to FIG. 12, one end of the driving mechanism connecting end 2 is provided with an externally threaded connector I 22, one end of the connecting mechanism body 3 is provided with an internally threaded coupling I 34, and the externally threaded connector I 22 and the internally threaded coupling I 34 are in thread fit connection.

Furthermore, in the present embodiment, as shown in FIG. 9 to FIG. 12, the driving mechanism connecting end 2 has a hollow inside and is provided with a partition plate 23, and the externally threaded connector I 22 and the driving mechanism connecting member 21 are located on two sides of the partition plate 23 respectively. As shown in FIG. 4, the externally threaded connector I 22 has a hollow inside, one end of the compression spring I 5 extends into the driving mechanism connecting end 2 from the externally threaded connector I 22 and abuts against the partition plate 23.

Further, in the present embodiment, the pressing column 4 has a hollow inside, and an end face 41 of one end of the pressing column is closed. An outer diameter of a bottom end of the connecting column 12 is greater than an inner diameter of the pressing column 4, and the other end of the compression spring I 5 abuts against the end face 41 of one end of the pressing column 4.

Further, in the present embodiment, the protrusion I 61 is arranged continuously around the inner wall of the outer sleeve 6.

Furthermore, in the present embodiment, as shown in FIG. 6, an inner wall of one end of the outer sleeve 6 close to the dildo connecting end 1 and the protrusion I 61 jointly form a groove 62, an embedding ring 8 is sleeved over the outer wall of the connecting mechanism body 3 at a position corresponding to the groove 62, and the embedding ring 8 is matched with the shape of the groove 62, and is embedded in the groove 62, as shown in FIG. 4.

Furthermore, in the present embodiment, as shown in FIG. 5, the dildo connecting end 1 includes an annular spacer 13, and the dildo connecting member 11 and the connecting column 12 are located on two sides of the annular spacer 13 respectively. An outer diameter of the annular spacer 13 is greater than or equal to an outer diameter of the embedding ring 8, and the annular spacer is overlapped with the embedding ring 8.

In the present embodiment, the driving mechanism connecting member 21 is an internally threaded coupling II.

In the present embodiment, the dildo connecting member 11 is an externally threaded connector II.

In the present embodiment, the limiting member 321 adopts a steel ball. In addition, the limiting member may also adopt any other shape, such as cube, cuboid or other irregular shapes.

Embodiment 2

Figure 13:
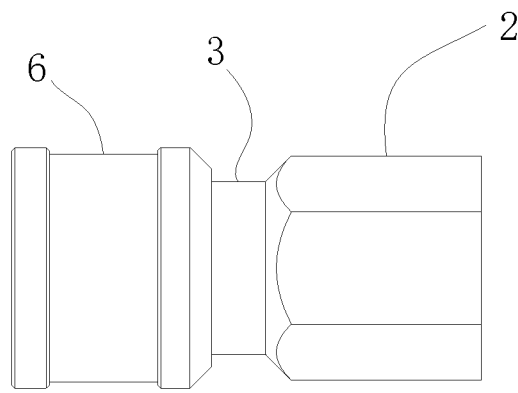
FIG. 13 is a schematic diagram of a state after a connecting mechanism body and a driving mechanism connecting end are connected in Embodiment 2 of the invention.
Figure 14:
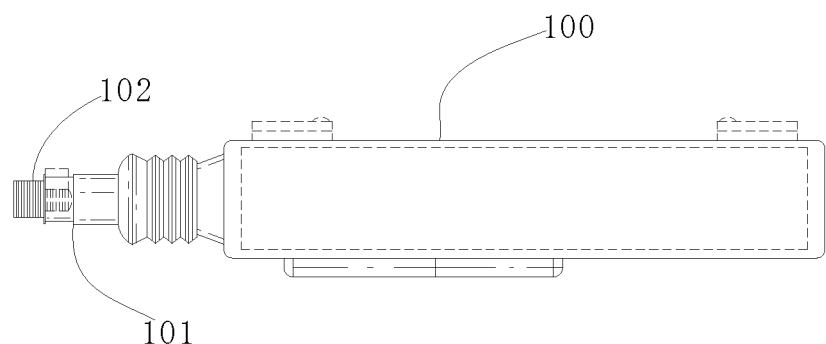
FIG. 14 is a schematic structural diagram of a driving mechanism in Embodiment 2 of the invention.
Figure 15:
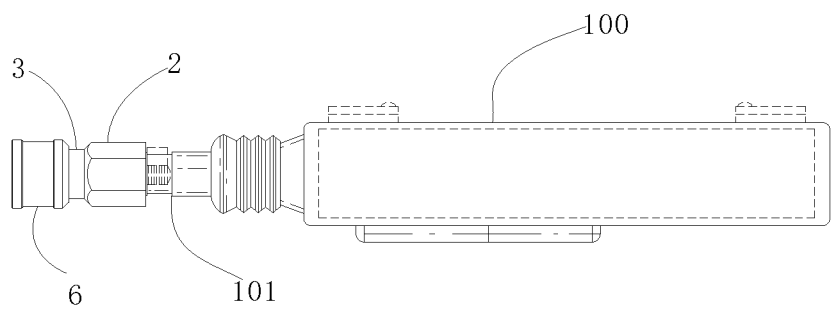
FIG. 15 is a schematic diagram of a state of connection with the driving mechanism after the connecting mechanism body and the driving mechanism connecting end are connected in Embodiment 2 of the invention.

The present embodiment provides a method for using a connecting mechanism of a dildo as described in Embodiment 1. The specific processes are as follows:

During use, firstly, one end of a driving mechanism connecting end 2 and one end of a connecting mechanism body 3 may be connected. As shown in FIG. 13, the other end of the driving mechanism connecting end 2 is then connected to an output shaft 101 of a driving mechanism 100 through a driving mechanism connecting member 21 (the driving mechanism may be a power source which drives the dildo to rotate or extend and retract, such as a driving motor and an electric telescopic rod). Specifically, in the present embodiment, an externally threaded connector I 22 on one end of the driving mechanism connecting end 2 is in thread fit connection with an internally threaded coupling I 34 on one end of the connecting mechanism body 3. In addition, an internally threaded coupling II is adopted as the driving mechanism connecting member 21, and is in thread connection with an externally threaded connector 102 matched with the output shaft 101 of the driving mechanism 100 (as shown in FIG. 14 to FIG. 15).

Figure 16:
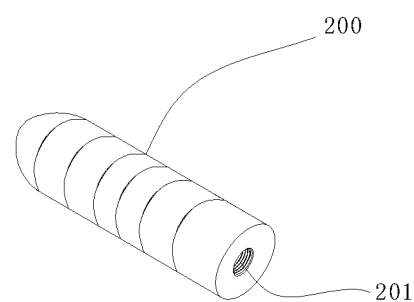
FIG. 16 is a schematic structural diagram of a dildo in Embodiment 2 of the invention.
Figure 17:
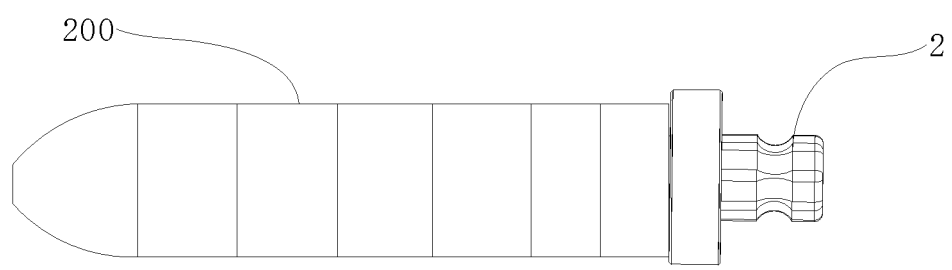
FIG. 17 is a schematic diagram of a state after the dildo and a dildo connecting end are connected in Embodiment 2 of the invention.

Then, a dildo connecting end 1 is connected onto a dildo 200. Specifically, in the present embodiment, an externally threaded connector II is adopted as a dildo connecting member 11, and is in thread connection with an internally threaded coupling 201 matched with the dildo 200 (as shown in FIG. 16 to FIG. 17).

Figure 18:
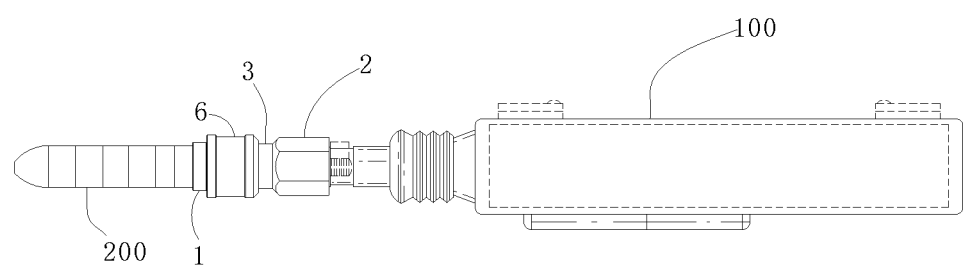
FIG. 18 is a schematic diagram of a state after the assembly of the dildo, a connecting member and the driving mechanism is complete in Embodiment 2 of the invention.

Afterwards, the dildo connecting end 1 is connected onto the connecting mechanism body 3. Specifically, an outer sleeve 6 is enabled to move on the connecting mechanism body 3 in a direction away from a limiting member 321, so that a protrusion I 61 on an inner wall of the outer sleeve leaves the position of the limiting member 321, and at this time, the limiting member 321 cannot limit the movement of a connecting column 12. The connecting column 12 of the dildo connecting end 1 is inserted into an internal connecting cavity 31 of the connecting mechanism body 3. Along with the continuous advance of the connecting column 12, the connecting column 12 exerts a pressure on a pressing column 4 of the internal connecting cavity 31, so that the pressing column 4 exerts a pressure on a compression spring I 5 and deforms it, until a limiting groove 121 in the connecting column 12 reaches the position of the limiting member 321, and the limiting member 321 enters the limiting groove 121, and moves the outer sleeve 6 back, so that the protrusion I 61 on the inner wall of the outer sleeve corresponds to the limiting member 321 in position again. Under the inward pressure exerted on the limiting member 321 by the outer sleeve 6, the limiting member 321 is clamped tightly in the limiting groove 121, so that the connecting column 12 can no longer move axially within the internal connecting cavity 31. Thus, connection of the dildo and the driving mechanism is completed, as shown in FIG. 18. Through the above connection mode, due to the compression effect of the outer sleeve, the limiting member 321 and the limiting groove 121 are clamped firmly, and are not easy to separate from each other due to an external force (for example, a vibration effect), so that a firm connection between the dildo and the connecting mechanism can be maintained.

When the dildo needs to be removed, the outer sleeve 6 is enabled to move on the connecting mechanism body 3 in the direction away from the limiting member 321 again, so that the protrusion I 61 on the inner wall of the outer sleeve 6 leaves the position of the limiting member 321. Since the limiting member 321 loses the pressure from the outer sleeve 6, when moving outward, the connecting column 12 can exert an outward pressure on the limiting member 321, so that the limiting member 321 moves outward and the limiting member 321 cannot limit the movement of the connecting column 12. Therefore, the compression spring I 5 restores to its original shape without an external force, and drives the connecting column 12 to move outward, so that the limiting groove 121 leaves the position of the limiting member 321. The connecting column 12 and the dildo 200 are moved outward together, until the connecting column 12 completely leaves the internal connecting cavity. The outer sleeve 6 is moved back to the position of the protrusion I 61 corresponding to the limiting member 321 to complete the disassembly of the dildo.

More specifically, in the present embodiment, since a compression spring II 7 is arranged, when moving in the direction away from the limiting member 321, the outer sleeve 6 will exert a pressure on the compression spring II 7, causing deformation of the compression spring II 7. When the outer sleeve 6 is released, an external force is lost, so that the compression spring II 7 restores to its original shape, and automatically drives the outer sleeve 6 back to the position of the protrusion I 61 corresponding to the limiting member 321, and the position of the outer sleeve 6 is further limited, thereby further ensuring that the outer sleeve will not move on the outer wall of the connecting mechanism body without an external force, and maintaining the compression effect of the protrusion I on the limiting member.

For those skilled in the art, various corresponding changes and variations can be given based on the above technical solutions and ideas, and all of these changes and variations should be included in the protection scope of the claims of the invention.

The invention claimed is:

1. A connecting mechanism of a dildo, comprising a dildo connecting end, a driving mechanism connecting end and a connecting mechanism body, wherein one end of the driving mechanism connecting end is connected to one end of the connecting mechanism body, and the other end of driving mechanism connecting end is provided with a driving mechanism connecting member; one end of the dildo connecting end is provided with a dildo connecting member, and the other end of the dildo connecting end is connected to the other end of the connecting mechanism body; the other end of the dildo connecting end is provided with a connecting column, the inside of the other end of the connecting mechanism body is provided with an internal connecting cavity matched with the connecting column, and the connecting column is capable of being inserted into the internal connecting cavity; a concave limiting groove is formed in the connecting column circumferentially, a limiting member embedding groove communicated with the internal connecting cavity is formed in an outer wall of the connecting mechanism body circumferentially, a limiting member is embedded in the limiting member embedding groove, and the limiting member is capable of entering the limiting groove; an outer sleeve is sleeved over the outside of the connecting mechanism body, and the outer wall of the connecting mechanism body has a space for the outer sleeve to move axially; a protrusion I is arranged at an inner wall of the outer sleeve, and when the protrusion I corresponds to the limiting member embedding groove in position, the protrusion I exerts a pressure on the limiting member.

2. The connecting mechanism of a dildo according to claim 1, wherein a pressing column and a compression spring I are sequentially arranged in the internal connecting cavity in a direction close to the driving mechanism connecting end, when the limiting member is located in the limiting groove, the connecting column exerts a pressure on the pressing column, and the pressing column exerts a pressure on the compression spring I, so that the compression spring I is in a deformed state.

3. The connecting mechanism of a dildo according to claim 1, wherein a compression spring II is sleeved over the outside of the connecting mechanism body, and the compression spring II is located between the connecting mechanism body and the outer sleeve; a protrusion II is arranged at an outer wall of one end of the connecting mechanism body, one end of the compression spring II abuts against the protrusion I, and the other end of the compression spring II abuts against the protrusion II.

4. The connecting mechanism of a dildo according to claim 3, wherein the protrusion II is arranged continuously around the outer wall of one end of the connecting mechanism body.

5. The connecting mechanism of a dildo according to claim 1, wherein the limiting groove is formed continuously around an outer wall of the connecting column circumferentially.

6. The connecting mechanism of a dildo according to claim 1, wherein there are a plurality of limiting member embedding grooves, and the plurality of limiting member embedding grooves are formed equidistantly around the outer wall of the connecting mechanism body circumferentially.

7. The connecting mechanism of a dildo according to claim 1, wherein one end of the driving mechanism connecting end is provided with an externally threaded connector I, one end of the connecting mechanism body is provided with an internally threaded coupling I, and the externally threaded connector I and the internally threaded coupling I are in thread fit connection.

8. The connecting mechanism of a dildo according to claim 2, wherein one end of the driving mechanism connecting end is provided with an externally threaded connector I, one end of the connecting mechanism body is provided with an internally threaded coupling I, and the externally threaded connector I and the internally threaded coupling I are in thread fit connection; the driving mechanism connecting end has a hollow inside and is provided with a partition plate, and the externally threaded connector I and the driving mechanism connecting member are located on two sides of the partition plate respectively; the externally threaded connector I has a hollow inside, one end of the compression spring I extends into the driving mechanism connecting end from the externally threaded connector I and abuts against the partition plate.

9. The connecting mechanism of a dildo according to claim 2, wherein the pressing column has a hollow inside, and an end face of one end of the pressing column is closed; an outer diameter of a bottom end of the connecting column is greater than an inner diameter of the pressing column, and the other end of the compression spring I abuts against the end face of one end of the pressing column.

10. The connecting mechanism of a dildo according to claim 1, wherein the protrusion I is arranged continuously around the inner wall of the outer sleeve.

11. The connecting mechanism of a dildo according to claim 1, wherein an inner wall of one end of the outer sleeve close to the dildo connecting end and the protrusion I jointly form a groove, an embedding ring is sleeved over the outer wall of the connecting mechanism body at a position corresponding to the groove, and the embedding ring is matched with the shape of the groove, and is embedded in the groove.

12. The connecting mechanism of a dildo according to claim 11, wherein the dildo connecting end comprises an annular spacer, and the dildo connecting member and the connecting column are located on two sides of the annular spacer respectively; an outer diameter of the annular spacer is greater than or equal to an outer diameter of the embedding ring, and the annular spacer is overlapped with the embedding ring.

13. The connecting mechanism of a dildo according to claim 1, wherein the driving mechanism connecting member is an internally threaded coupling II.

14. The connecting mechanism of a dildo according to claim 1, wherein the dildo connecting member is an externally threaded connector II.

15. The connecting mechanism of a dildo according to claim 1, wherein the limiting member adopts a steel ball.

\* \* \* \* \*